United States Patent
Grübl

(10) Patent No.: US 10,024,462 B2
(45) Date of Patent: Jul. 17, 2018

(54) ARRANGEMENT FOR FASTENING A FLEXIBLE TUBE, IN PARTICULAR A CORRUGATED TUBE, TO AN ARTICLE

(71) Applicant: MAN Truck & Bus AG, München (DE)

(72) Inventor: Wolfgang Grübl, München (DE)

(73) Assignee: MAN Truck & Bus AG, München (DE)

( * ) Notice: Subject to any disclaimer, the term of this patent is extended or adjusted under 35 U.S.C. 154(b) by 0 days.

(21) Appl. No.: 15/343,753

(22) Filed: Nov. 4, 2016

(65) Prior Publication Data
US 2017/0122461 A1    May 4, 2017

(30) Foreign Application Priority Data
Nov. 4, 2015 (DE) .......... 10 2015 014 226

(51) Int. Cl.
| F16L 3/00 | (2006.01) |
| F16L 3/14 | (2006.01) |
| F16L 11/15 | (2006.01) |

(52) U.S. Cl.
CPC ............ F16L 3/14 (2013.01); F16L 11/15 (2013.01)

(58) Field of Classification Search
CPC .......... F16L 3/1058; F16L 3/12; F16L 3/1203
USPC ................ 138/106, 108; 248/65, 74.4–74.3
See application file for complete search history.

(56) References Cited

U.S. PATENT DOCUMENTS

| 3,243,151 A * | 3/1966 | Varney ............... F16L 3/1207 248/74.1 |
| 3,711,632 A | 1/1973 | Ghirardi |
| 3,848,839 A * | 11/1974 | Tillman ................ F16L 3/04 248/62 |
| 4,258,515 A * | 3/1981 | Owen .................. H02G 3/04 138/104 |
| 5,803,654 A * | 9/1998 | Spease ................. F16C 1/262 248/74.1 |
| 6,010,099 A | 1/2000 | Wertz et al. |
| 6,105,907 A * | 8/2000 | Komsitsky ............ F16L 3/04 248/346.03 |

(Continued)

FOREIGN PATENT DOCUMENTS

| DE | 102010007983 A1 | 8/2011 |
| EP | 1312845 A1 | 5/2003 |

(Continued)

OTHER PUBLICATIONS

Extended European Search Report issued in corresponding application No. 16002182.0 dated Mar. 21, 2017.

*Primary Examiner* — Patrick F Brinson
(74) *Attorney, Agent, or Firm* — Carter, DeLuca, Farrell & Schmidt, LLP

(57) ABSTRACT

The present disclosure relates to an arrangement for fastening a flexible tube, in particular a corrugated tube, to an article, in particular to a component of a vehicle. The arrangement comprises a flexible tube, which is placed on the article; a covering element, as anti-squeeze protection for the flexible tube, the covering element being supported on the article on both sides of the flexible tube and covering at least a portion of the flexible tube in an arcuate manner; and a band clamp, which is guided around an outer side of the covering element and around a side of the article that faces away from the flexible tube.

17 Claims, 3 Drawing Sheets

(56) References Cited

U.S. PATENT DOCUMENTS

| | | | |
|---|---|---|---|
| 6,700,064 B2* | 3/2004 | Aoki | B60R 16/0215 |
| | | | 174/69 |
| 6,729,588 B2* | 5/2004 | Wilkinson, III | F16L 3/1008 |
| | | | 248/74.1 |
| 7,722,001 B2* | 5/2010 | Trotter | F16B 5/0685 |
| | | | 248/65 |
| 7,770,848 B2* | 8/2010 | Johnson | F16L 3/1207 |
| | | | 248/65 |
| 8,469,061 B2* | 6/2013 | Thuesen | F16L 3/1025 |
| | | | 138/106 |
| 2009/0140106 A1 | 6/2009 | Johnson et al. | |
| 2014/0131528 A1 | 5/2014 | Blakeley et al. | |
| 2015/0026955 A1* | 1/2015 | Rodrigue | F16L 3/237 |
| | | | 29/525.03 |
| 2015/0151693 A1 | 6/2015 | Inao et al. | |
| 2015/0237770 A1 | 8/2015 | Yamasaki et al. | |

FOREIGN PATENT DOCUMENTS

| | | |
|---|---|---|
| EP | 2628987 A2 | 8/2013 |
| FR | 3016749 A1 | 7/2015 |
| WO | 2014/167987 A1 | 10/2014 |

\* cited by examiner

ARRANGEMENT FOR FASTENING A FLEXIBLE TUBE, IN PARTICULAR A CORRUGATED TUBE, TO AN ARTICLE

FIELD OF THE DISCLOSURE

The present disclosure relates to an arrangement for fastening a flexible tube, in particular a corrugated tube, to an article, in particular to a component of a vehicle.

BACKGROUND

In the automotive sector, corrugated tubes are used inter alia for guiding lines. Thus, it is conventional to combine flexible lines, as are used for example for supplying electrical consumers, such as external marker lights, for example, or for transmitting control signals between control units and sensors, to form branching line bundles. In order to protect the line bundles, also known as cable harnesses, from mechanical influences, these are frequently guided, at least in portions, in flexible corrugated tubes which are usually produced from plastics material and enclose the line bundle only loosely. In order to fasten such a corrugated hose to a component of the vehicle, it is known practice to fasten the corrugated tube to the component by means of a cable tie, wherein the cable tie is placed around the corrugated tube and around the component and clamped securely in place. Since the cable tie rests directly against the corrugated tube, this known approach has the disadvantage that clamping the cable tie securely in place can result in the corrugated tube being squeezed excessively.

SUMMARY

Therefore, it is an object of the present disclosure to provide an improved arrangement for fastening a flexible tube, in particular a corrugated tube, to an article, with which arrangement the disadvantages of conventional techniques can be avoided. The object of the present disclosure is in particular to provide an arrangement for fastening a flexible tube using a band clamp, for example a cable tie, wherein the risk of marked squeezing of the flexible tube is avoided.

These objects are achieved by an arrangement having the features of claim 1. Advantageous embodiments and applications of the present disclosure are the subject matter of the dependent claims and are explained in more detail in the following description with partial reference to the figures.

According to general aspects of the present disclosure, an arrangement for fastening a flexible tube to an article is provided. The article to which the flexible tube is fastened can be in particular a component of a vehicle. The arrangement comprises a flexible tube which is placed on the article. A flexible tube should be understood as being a long, cylindrical hollow body, for example for the passage of fluids or electric lines, which is furthermore pliable or is bendable in the longitudinal direction. The flexible tube can be in particular a corrugated tube. The term "flexible tube" is also intended to include flexible tubes which, on account of a comparatively small cross section, are usually known as hoses. The flexible tube can also be in particular a corrugated hose. At least one electric line, for example, can be guided through the flexible tube. It is also possible for a fluid line, for example a spray water line for a windscreen washer system or a fibre-optic cable to be guided through the flexible tube. It is also possible for the flexible tube to have no content.

The arrangement furthermore comprises a covering element for the flexible tube, which is supported on the article on both sides of the flexible tube and covers at least a portion of the flexible tube in an arcuate or bridge-like manner, i.e. forming a curve. The covering element can have a U-shaped, arcuate or V-shaped cross section, for example, as seen in the longitudinal direction of the flexible tube.

The arrangement furthermore comprises a band clamp which is guided around an outer side of the covering element and around a side of the article that faces away from the flexible tube. In order to allow particularly rapid assembly, the band clamp can be embodied for example as a locking band, more preferably as a self-locking locking band. The band clamp can be for example a cable tie.

The arrangement according to the present disclosure has the particular advantage that the clamping element directly rests against and acts on only the covering element and the article, but does not come into contact with the flexible tube. The clamping element thus generates a clamping force directed towards the flexible tube, said clamping force acting on the flexible tube only indirectly via the covering element and the article. The covering element serves in this case as anti-squeeze protection for the flexible tube and acts as an anti-squeeze protection element. Excessive squeezing of the corrugated tube can thus be avoided. At the same time, a rapid, uncomplicated fastening option for the flexible tube is provided. The fastening approach according to the present disclosure can be used at all problematic points on a vehicle at which the flexible tube can be squeezed, for example at points at which thin corrugated tubes with a small degree of filling, for example for powering external marker lights, are used.

The region in which the flexible tube rests against the article preferably forms a surface line of the flexible tube, said surface line extending in the longitudinal direction of the flexible tube. The outer side of the covering element is preferably an outer surface of the covering element that faces away from the tube. The inner side of the covering element preferably forms the outer face, facing the flexible tube, of the covering element, forming a receiving space for the flexible tube. The side of the article that faces away from the flexible tube preferably comprises that part of the outer face of the article against which the tube does not rest.

Particularly effective anti-squeeze protection can be achieved if the covering element is produced from a non-elastic material. In this case, a particularly advantageous variant provides for the covering element to be embodied as a non-elastic plastics component. However, the covering element can also be formed from some other material, for example metal or wood.

According to a preferred embodiment, the covering element has two legs by way of which the covering element is supported on the article on both sides of the flexible tube. According to this embodiment, a recess, formed by the inner sides of the legs, for receiving the flexible tube is matched to a diameter of the flexible tube such that the flexible tube rests against the two legs. As a result, the flexible tube is fixed evenly on the article by being covered with the covering element.

In an advantageous variant of this embodiment, an inner contour, facing the flexible tube, of the cover is matched to an outer contour of the flexible tube such that the cover rests in a flat, in particular form-fitting manner against the flexible tube on a side of the latter that faces the article.

One possibility afforded by the implementation according to the present disclosure furthermore provides for the article to be a carrier tube with a larger diameter than the flexible tube, and for the end faces of the covering element, by way of which the covering element is supported on the carrier tube, to have a curvature which corresponds to the curvature of the carrier tube. As a result, slippage or shifting of the covering element on the carrier tube can be prevented better.

An alternative possibility afforded by the implementation according to the present disclosure provides for the article to have a planar contact surface on which the flexible tube is placed. In this case, through-openings, in particular slots, in the contact surface, through which the band clamp is guided, can be provided in the region of or adjacent to the points at which the covering element is supported on the planar contact surface.

The present disclosure furthermore relates to a motor vehicle, in particular a commercial vehicle, having an arrangement for fastening a flexible tube as described in this document.

BRIEF DESCRIPTION OF THE DRAWINGS

The above-described preferred embodiments and features of the present disclosure are able to be combined with one another as desired. Further details and advantages of the present disclosure are described in the following text with reference to the appended drawings, in which.

DETAILED DESCRIPTION

Figure 1:
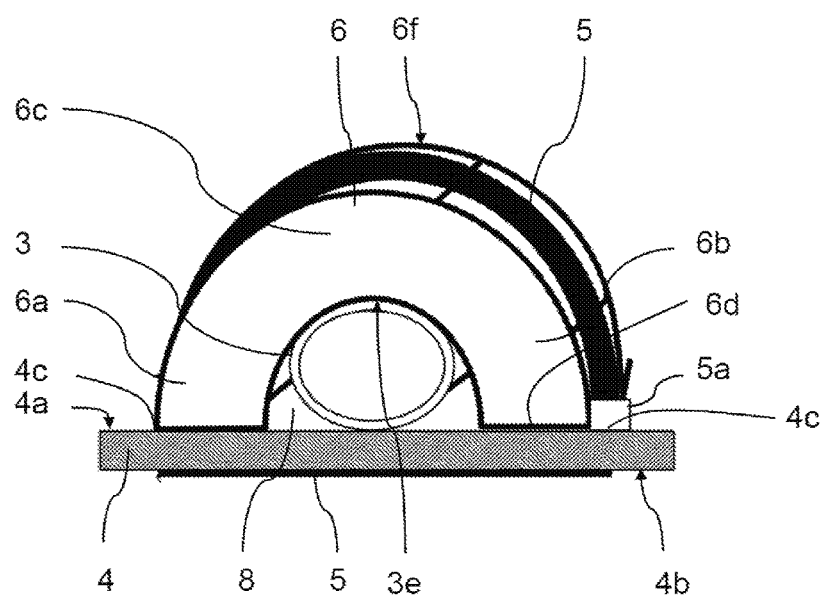
FIG. 1 shows a cross-sectional view of an arrangement for fastening a flexible tube according to one embodiment of the present disclosure.

FIG. 1 shows a schematic cross-sectional view of an arrangement for fastening a flexible tube according to one embodiment of the present disclosure. The flexible tube 3 serves for example for the passage of lines in a vehicle and is intended to be fastened to a component 4 having a planar contact surface 4a. The flexible tube 3 can be embodied in a conventional manner, for example as a corrugated hose, wherein the hose material can consist of vulcanized rubber or of a pliable plastics material.

In this case, the flexible tube is first of all placed on the planar contact surface 4a and subsequently covered with a covering element 6.

The covering element 6 is embodied as a non-elastic plastics component. The covering element has an arcuate cross section and has two legs 6a, 6b which extend away from an upper central shoulder 6c and by way of which the covering element 6 is supported on the planar contact surface 4a of the article 4 on both sides of the flexible tube 3.

The covering element 6 thus covers the flexible tube 3 in an arcuate manner along a longitudinal portion of the flexible tube 3. A recess 8 for receiving the flexible tube 3 is formed by the arcuate cross section or the inner sides of the legs.

In this case, the recess 8 is matched to the diameter of the flexible tube 3 or adapted to the outer contour of the flexible tube such that the cover 6 rests in a flat, in particular form-fitting manner against an upper region of the tube 3. This region of the flexible tube 3, opposite the article 4, is indicated by the reference sign 3e in FIG. 1.

Subsequently, a cable tie 5 is guided around the outer arcuate surface 6f of the covering element 6 and guided around the side 4b of the article 4 that faces away from the flexible tube 3. To this end, slots 4c for the passage of the cable tie 5 are accordingly introduced into the article 4. Subsequently, the cable tie is clamped in place by being locked at the cable tie head 5a.

Figure 3:
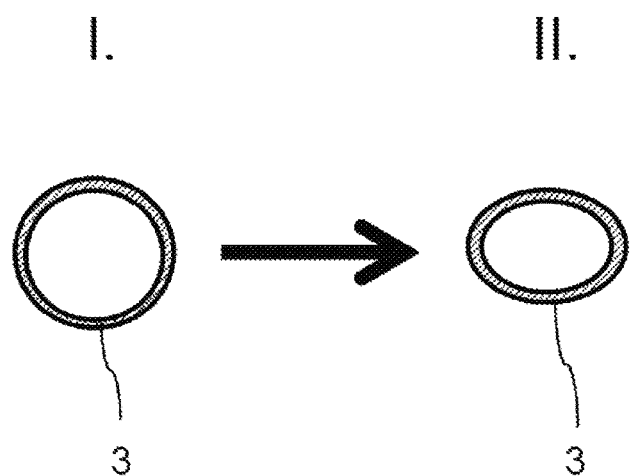
FIG. 3 schematically shows a cross-sectional view of a flexible tube in the non-assembled and assembled states.

Therefore, the cable tie 5 is not in direct contact with the flexible tube at any point, but rather encloses the covering element 6 and the component 4. The covering element 6 transfers the clamping force of the cable tie 5 to the flexible tube 3, but at the same time prevents excessive squeezing of the flexible tube 3. This is illustrated schematically and by way of example in FIG. 3. The state of the flexible tube 3 in the normal state, i.e. in the non-assembled state, in which no clamping force acts from the outside on the wall of the flexible tube 3, is illustrated under "I.". The cross section of the flexible tube 3 is circular. The state of the flexible tube 3 in the assembled and clamped state of FIG. 1 is illustrated under "II.". As a result of the clamping force exerted by the covering element 6, the flexible tube 3 deforms only slightly, without being squeezed.

Figure 2:
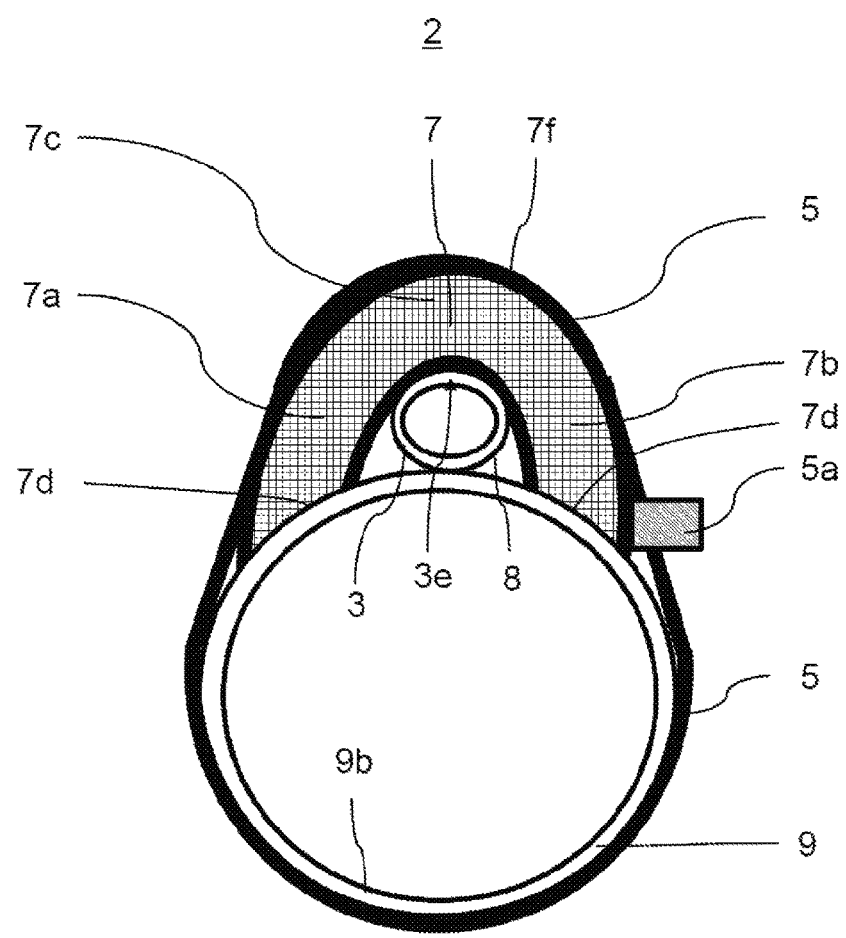
FIG. 2 shows a cross-sectional view of an arrangement for fastening a flexible tube according to a further embodiment of the present disclosure.

FIG. 2 shows a cross-sectional view of an arrangement 2 for fastening a flexible tube according to a further embodiment of the present disclosure. In this case, components with the same reference signs correspond to the components in FIG. 1 and are not described separately.

A particular feature of this embodiment is that the article to which the flexible tube 3 is intended to be fastened is a tube, known here as a carrier tube 9. The covering element 7, serving as an anti-squeeze protection bridge, is again a component made of non-elastic plastics material with an arcuate cross section.

In order to fasten the flexible tube 3 to the carrier tube 9, the flexible tube 3 is first of all placed on the carrier tube 9 and subsequently covered with the covering element 7. The covering element 7 has in turn two legs 7a, 7b, which extend away from an upper central shoulder 7c and by way of which the covering element 7 is supported on the outer wall of the carrier tube 9 on both sides of the flexible tube 3. Therefore, the covering element 7 covers the flexible tube 3 in an arcuate manner along a longitudinal portion of the flexible tube 3.

The end faces 7d of the legs 7a, 7b, by way of which the covering element is supported on the carrier tube 3, have a curvature which corresponds to the curvature of the carrier tube 9. In this case, the recess 8 is matched to the diameter of the flexible tube 3 or adapted to the outer contour of the flexible tube such that the cover 7 rests in a flat, in particular form-fitting manner against an upper region 3e of the tube 3.

Subsequently, the cable tie 5 is guided around the outer arcuate surface 7f of the covering element 7 and guided around that side 9b of the carrier tube 9 that faces away from the flexible tube 3, i.e. around a lower circular-arc half of the carrier tube 9. Subsequently, the cable tie is clamped in place by being locked at the cable tie head 5a.

According to this embodiment 2, too, the cable tie 5 is not in direct contact with the flexible tube 3 at any point, but is guided externally around the covering element 7 and the carrier tube 9. As a result, the flexible tube 3 can be fastened quickly and securely to the carrier tube 9 without excessive squeezing of the flexible tube 3 occurring.

Although the present disclosure has been described with reference to particular exemplary embodiments, it is obvious to a person skilled in the art that various modifications can be made and equivalents can be used as a replacement, without departing from the scope of the present disclosure.

In addition, a large number of modifications can be made without departing from the associated scope. Consequently, the present disclosure is not intended to be limited to the disclosed exemplary embodiments but is intended to include all exemplary embodiments which are covered by the scope of the appended claims. In particular, the present disclosure also claims protection for the subject matter and the features of the dependent claims, independently of the claims referred to.

LIST OF REFERENCE SIGNS 1, 2 Arrangement for fastening a flexible tube
3 Flexible tube
3e Upper region of the flexible tube
4 Article
4a Planar contact surface
4b Underside of the article
4c Slots
5 Band clamp, in particular cable tie
5a Cable tie head
6, 7 Covering element
6a, 6b, 7a, 7b Legs
7c, 6c Shoulder
7d Leg end face
6f, 7f Outer arcuate surface
8 Recess
9 Carrier tube
9b Side of the carrier tube that faces away from the flexible tube

The invention claimed is:

1. An arrangement for fastening a flexible tube, to a carrier tube having a larger diameter than the flexible tube comprising:
   a flexible tube, which is placed on the carrier tube;
   a covering element, which is supported on the carrier tube about the exterior of the flexible tube and covers at least a portion of the flexible tube in an arcuate manner, wherein the covering element comprises end faces, each end face having a curvature which corresponds to the curvature of the carrier tube and which support the covering element on the carrier tube; and
   a band clamp, which is guided around an outer side of the covering element and around a side of the carrier tube that faces away from the flexible tube.

2. The arrangement according to claim 1, wherein the covering element has a U-shaped, arcuate or V-shaped cross section for covering the flexible tube.

3. The arrangement according to claim 1, wherein the article is a component of a vehicle.

4. The arrangement according to claim 1, wherein the covering element further comprises two legs which support the covering element on the article about the exterior of the flexible tube.

5. The arrangement according to claim 4 further comprising a recess, formed by the inner sides of the legs, for receiving the flexible tube, wherein the recess is matched to a diameter of the flexible tube such that the flexible tube rests against both legs.

6. The arrangement according to claim 1 wherein an inner contour of the cover, facing the flexible tube, is matched to an outer contour of the flexible tube such that the cover rests in a flat manner against a side of the flexible tube that faces away from the article.

7. The arrangement according to claim 1 wherein an inner contour of the cover, facing the flexible tube, is matched to an outer contour of the flexible tube such that the cover rests in a form-fitting manner against a side of the flexible tube that faces away from the article.

8. The arrangement according to claim 1, further comprising through-openings through which the band clamp is guided, wherein the through-openings are slots.

9. The arrangement according to claim 1, wherein the band clamp is a locking band.

10. The arrangement according to claim 9, wherein, the locking band is a self-locking locking band.

11. The arrangement according to claim 1, wherein the band clamp is a cable tie.

12. The arrangement according to claim 1, wherein the covering element is produced from a non-elastic material.

13. The arrangement according to claim 12, wherein the non-elastic material is a plastic.

14. The arrangement according to claim 1, wherein the flexible tube is a corrugated tube.

15. The arrangement according to claim 14, wherein at least one electric line is guided in the flexible tube.

16. The arrangement according to claim 1, wherein the flexible tube is a corrugated hose.

17. A motor vehicle, in particular a commercial vehicle, including an arrangement for fastening a flexible tube, the arrangement comprising:
   a flexible tube, which is placed on a carrier tube having a larger diameter than the flexible tube;
   a covering element, which is supported on the carrier tube about the exterior of the flexible tube and covers at least a portion of the flexible tube in an arcuate manner wherein the covering element comprises end faces, each end face having a curvature which corresponds to the curvature of the carrier tube and which support the covering element on the carrier tube; and
   a band clamp, which is guided around an outer side of the covering element and around a side of the carrier tube that faces away from the flexible tube.

* * * * *